United States Patent
McDonald et al.

(10) Patent No.: US 9,067,722 B2
(45) Date of Patent: Jun. 30, 2015

(54) MULTI-LAYERED SUSPENSION PACKAGE ASSEMBLY

(75) Inventors: John McDonald, Fallbrook, CA (US);
Frank Comerford, Laguna Niguel, CA (US); Myles Comerford, Rancho Santa Fe, CA (US)

(73) Assignee: CLEARPAK, LLC, Tustin, CA (US)

( * ) Notice: Subject to any disclaimer, the term of this patent is extended or adjusted under 35 U.S.C. 154(b) by 0 days.

(21) Appl. No.: 13/620,543

(22) Filed: Sep. 14, 2012

(65) Prior Publication Data
US 2014/0076769 A1    Mar. 20, 2014

(51) Int. Cl.
| B65D 81/02 | (2006.01) |
| B65D 81/07 | (2006.01) |
| B65D 5/50 | (2006.01) |

(52) U.S. Cl.
CPC ............ B65D 81/022 (2013.01); B65D 81/02 (2013.01); B65D 81/075 (2013.01); B65D 5/5028 (2013.01)

(58) Field of Classification Search
USPC .................................................. 206/583, 521
See application file for complete search history.

(56) References Cited

U.S. PATENT DOCUMENTS

| RE36,412 | E * | 11/1999 | Jones ............................. | 206/223 |
| 6,308,828 | B1 * | 10/2001 | Jones ............................. | 206/223 |
| 8,505,731 | B2 * | 8/2013 | McDonald et al. ........... | 206/583 |
| 2004/0129601 | A1 * | 7/2004 | Lofgren et al. ............... | 206/583 |
| 2005/0252825 | A1 * | 11/2005 | Lofgren et al. ............... | 206/583 |
| 2006/0000743 | A1 * | 1/2006 | Lofgren et al. ............... | 206/583 |
| 2008/0223750 | A1 * | 9/2008 | McDonald et al. ........... | 206/583 |
| 2009/0188833 | A1 * | 7/2009 | Klos ............................. | 206/583 |
| 2010/0276330 | A1 * | 11/2010 | McDonald et al. ........... | 206/583 |
| 2011/0139673 | A1 * | 6/2011 | Klos ............................. | 206/583 |
| 2012/0234723 | A1 * | 9/2012 | Klos ............................. | 206/583 |
| 2013/0091807 | A1 * | 4/2013 | McDonald et al. ............. | 53/473 |

* cited by examiner

*Primary Examiner* — Jacob K Ackun
(74) *Attorney, Agent, or Firm* — Knobbe Martens Olson & Bear LLP

(57) ABSTRACT

A packaging device can include a resilient member formed of two layers of different material, connected together such as by heat sealing. The layers can be made from different materials or the same materials having different thicknesses, modules of elasticity, melting index, or other different characteristics.

13 Claims, 8 Drawing Sheets

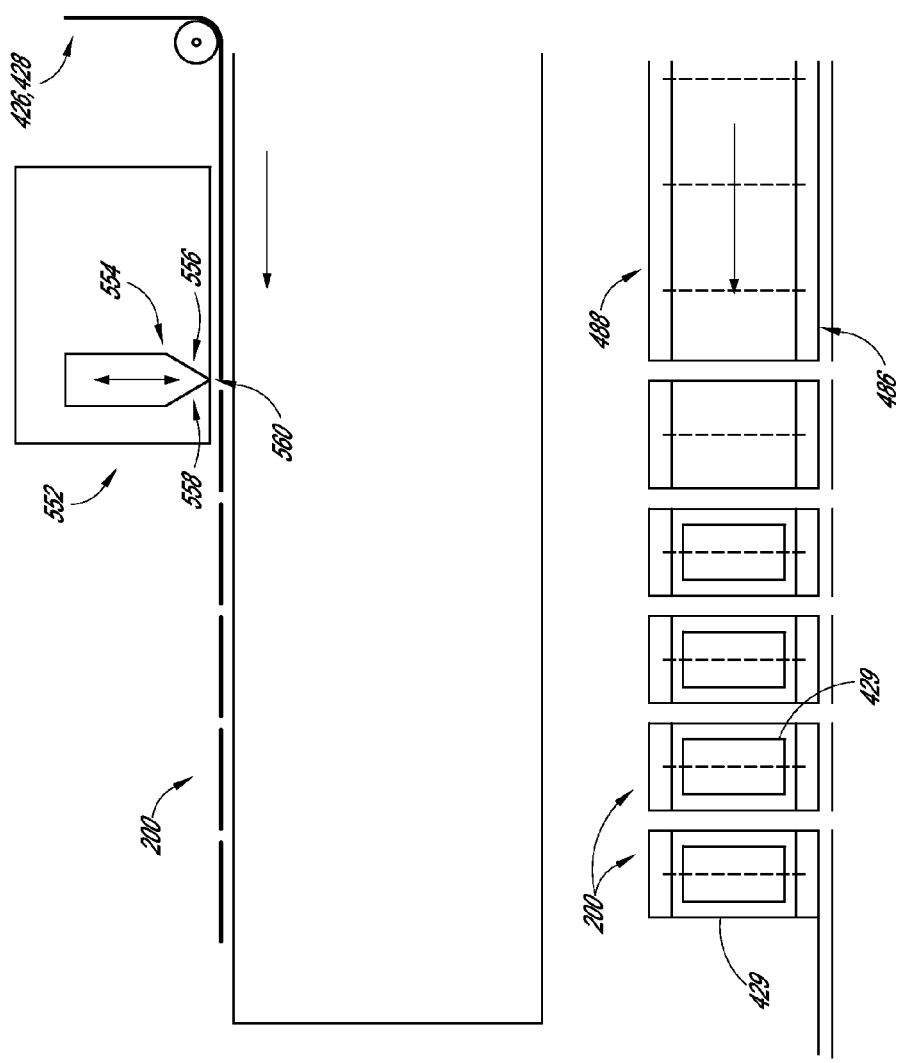

MULTI-LAYERED SUSPENSION PACKAGE ASSEMBLY

BACKGROUND OF THE INVENTIONS

1. Field of the Inventions

The present inventions are directed to a package assembly. In particular, the present inventions are directed to a suspension package assembly that includes a stretchable retention member made from two layers of material attached together.

2. Description of the Related Art

Protective packaging devices are often used to protect goods from shocks and impacts during shipping or transportation. For example, when transporting articles that are relatively fragile, it is often desirable to cushion the article inside a box to protect the article from a physical impact with the inner walls of the box that might be caused by shocks imparted to the box during loading, transit, and/or unloading.

In most cases, some additional structure is used to keep the article from moving uncontrollably within the box. Such additional structures include paper or plastic packing material, structured plastic foams, foam-filled cushions, and the like. Ideally, the article to be packaged is suspended within the box so as to be spaced from at least some of the walls of the box, thus protecting the article from other foreign objects which may impact or compromise the outer walls of the box.

U.S. Pat. No. 6,675,973 discloses a number of inventions directed to suspension packaging assemblies which incorporate frame members and one or more retention members. For example, many of the embodiments of the U.S. Pat. No. 6,675,973 patent include the use of a retention member formed of a resilient material. Additionally, some of the retention members include pockets at opposite ends thereof.

In several of the embodiments disclosed in the U.S. Pat. No. 6,675,973 patent, free ends of the frame members are inserted into the pockets of the retention member. The free ends of the frame member are then bent, pivoted, or folded to generate the desired tension in the retention member. Because the retention member is made from a resilient material, the retention member can stretch and thus provide a mechanism for suspending an article to be packaged, for example, within a box.

SUMMARY OF THE INVENTIONS

An aspect of at least one of the embodiments disclosed herein includes the realization that packaging devices that are designed to retain items to be packaged using a thin stretchable film can be further improved by forming the stretchable film member from two layers of material connected together. As such, the resulting resilient member can be manufactured using high speed manufacturing processes, as well as other benefits.

For example, in some embodiments, the resilient member can be formed with two layers of different material, heat sealed to one another. In some cases, the two different materials can be different kinds of material, different thicknesses of the same material, different grades of translucency (e.g., one layer being opaque and one layer being transparent), different modules of elasticity or other different characteristics. When using heat sealing to attach the layers to one another, different materials having melt index values over a large range of such values can be used. For example, with regard to some materials, different layers made from different materials can be heat sealed together using high speed manufacturing equipment. Such high speed heat sealing is achieved more easily when the melt index of these materials falls approximately within the range of 7.0 to 10.0. However, other materials and other attachment techniques can also be used.

Thus, in accordance with an embodiment, a suspension packaging assembly can comprise at least one frame member having a central portion, a first end and a second end disposed opposite the first end relative to the central portion, a first foldable portion disposed at the first end and a second foldable portion disposed at the second end. Additionally, a resilient retention member can comprise a first layer having first and second longitudinal ends and first and second lateral edges and a second layer having first and second longitudinal ends and first and second lateral edges, the first layer being heat sealed to the second layer along the corresponding first and second lateral edges.

In accordance with another embodiment, a resilient member for providing damage protection for packaged goods can comprise a first layer having first and second longitudinal ends and first and second lateral edges. A second layer can include first and second longitudinal ends and first and second lateral edges, where the first layer is heat sealed to the second layer along the corresponding first and second lateral edges.

All of these embodiments are intended to be within the scope of at least one of the inventions disclosed herein. These and other embodiments of the inventions will become readily apparent to those skilled in the art from the following detailed description of the preferred embodiments having reference to the attached figures, the inventions not being limited to any particular preferred embodiment disclosed.

BRIEF DESCRIPTION OF THE DRAWINGS

These and other features of the inventions are described below with reference to the drawings of several embodiments of the present package assemblies and kits which are intended to illustrate, but not to limit, the inventions. The drawings contain the following figures:

FIG. 10 is a schematic illustration of a heat sealing and cutting device of the system of FIG. 6 which heat seals and cuts apart retention members from the continuous strip of FIGS. 8 and 9.

DETAILED DESCRIPTION OF THE PREFERRED EMBODIMENTS

An improved packaging assembly is disclosed herein. The packaging assembly includes an improved structure which provides new alternatives to known suspension packaging systems.

In the following detailed description, terms of orientation such as "upper," "lower," "longitudinal," "horizontal," "vertical," "lateral," "midpoint," and "end" are used herein to simply the description in the context of the illustrated embodiments. Because other orientations are possible, however, the present inventions should not be limited to the illustrated orientations. Additionally, the term "suspension" is not intended to require that anything, such as an article to be packaged, is suspended above anything. Rather, the terms "suspended" as used herein, is only intended to reflect that such an article is held in a position spaced from another member, such as at least one of the walls of a container or box. Those skilled in the art will appreciate that other orientations of various components described herein are possible.

Figure 1:
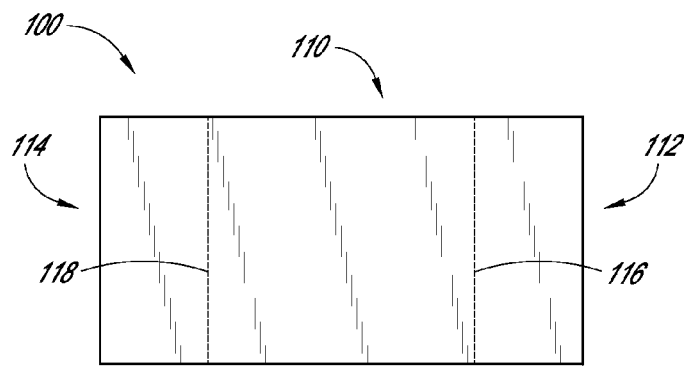
FIG. 1 is a plan view of a frame member having a central portion and two foldable portions disposed at opposite ends relative to the central portion.
Figure 2:
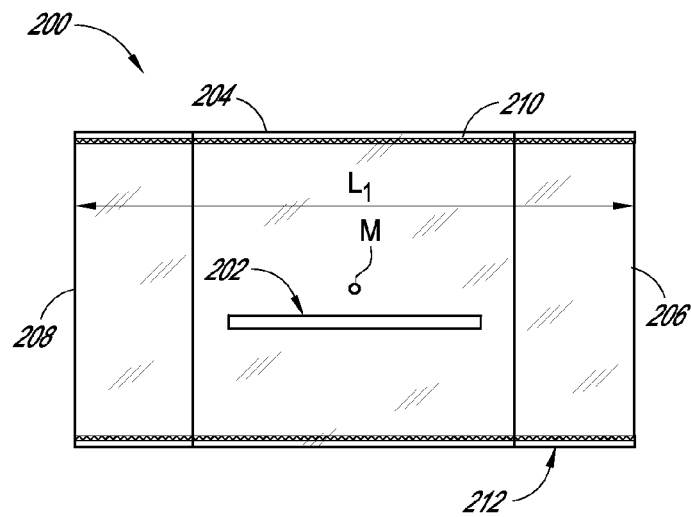
FIG. 2 is a plan view of a resilient retention member formed of two layers and having pockets disposed at opposite longitudinal ends.

The suspension packaging assemblies disclosed herein can include a frame member 100 (FIG. 1) and a retention member 200 (FIG. 2). The suspension packaging assemblies and components disclosed herein are described in the context of a suspension packaging assembly formed from a frame member and a retention member, because they have particular utility in this context. However, the inventions disclosed herein can be used in other context as well.

With reference to FIG. 1, the frame member 100 is illustrated in an unfolded state and is constructed in accordance with an embodiment. Generally, the frame member 100 includes a central portion 110 and a pair of opposing foldable portions 112, 114. The central member 110 can be configured to engage or provide support for one or more articles to be packaged.

Figure 4:
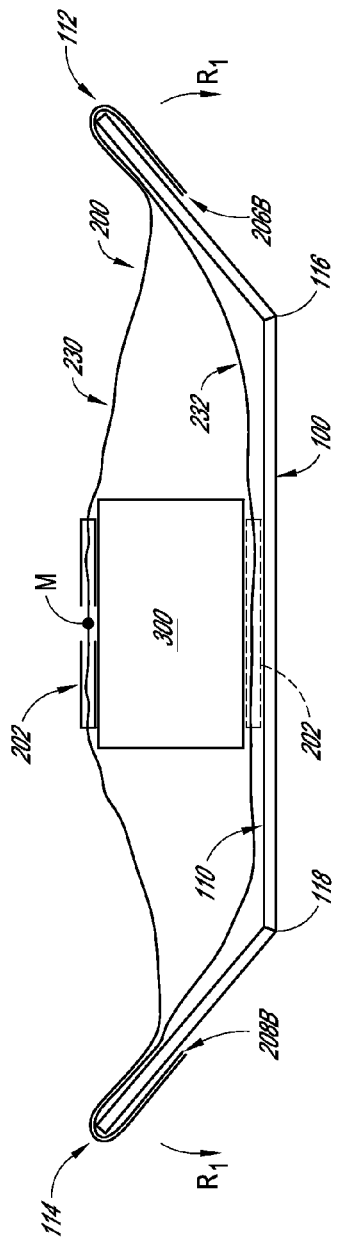
FIG. 4 is a schematic side elevational view of an assembly including the frame member of FIG. 1 and the resilient retention member of FIGS. 2-3 connected together with an article packaged therewith.
Figure 5:
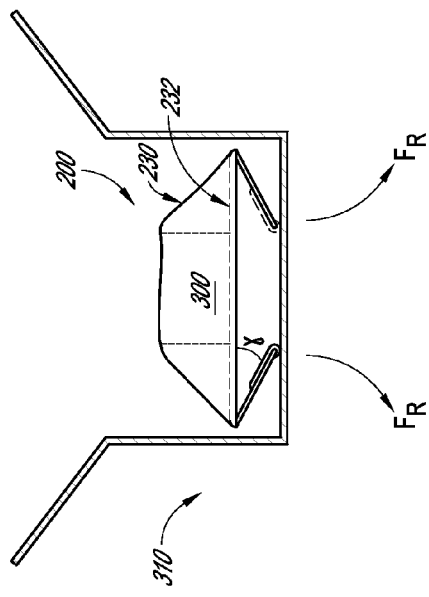
FIG. 5 is a schematic side elevational view of the frame member in resilient retention member and article packaged therewith disposed inside a container.

In some embodiments, the foldable portions 112, 114 are configured to increase a tension in the retention member 200 (FIG. 2) for holding one or more articles in a desired position relative to the central portion 110; an exemplary position being shown in FIGS. 4 and 5.

With continued reference to FIG. 1, the frame member 100 can be constructed from various materials, including but without limitation, pulp, paper, cardboard, corrugated cardboard, plastic, combinations thereof, and other appropriate materials. The chosen material for constructing the packaging member 100 can be any substantially rigid, but foldable material. It will be appreciated that, although denominated as rigid or substantially rigid, the chosen material would preferably have an amount of flexibility in the cases of physical impact. In some embodiments, the material used to form the packaging member 100 is a single wall corrugated C-flute cardboard. The illustrated packaging member 100 is a generally thin, planar member; however, the packaging member 100 can have other configurations.

The central portion 110 can be sized and dimensioned so as to engage or provide support for one or more articles. Although the central portion 110 is described primarily as being disposed at the center of the packaging member 100, the central portion 110 can be at other locations. Additionally, the central portion 110 can comprise a plurality of members, each configured to engage an article. For the sake of convenience, the central portion 110 is described as a generally planar centrally disposed member.

The size of the central portion 110, which defines a loading area, can be chosen arbitrarily or to accommodate, support, or engage an article of a particular size. The loading area size can be chosen based on the number and configuration of the articles on or proximate to the central portion 110. In some non-limiting exemplary embodiments, the central portion can be used to package one or more communication devices (e.g., portable phones, cellular phones, radios, headsets, microphones, etc.), electric devices and components, accessories (e.g., cellular phone covers), storage devices (e.g., disk drives), and the like. In certain embodiments, the central portion 110 is configured to package one more portable music players, such as IPODs® or MP3 players.

It is contemplated that the central portion 110 can be designed to package any number and type of articles. In the illustrated embodiment, the central portion 110 is somewhat square shaped and has a surface area (i.e., the loading area) of about 40-60 inches square. In some non-limiting embodiments, the central portion has a loading area more than about 40 inches square, 45 inches square, 50 inches square, 55 inches square, 60 inches square, and ranges encompassing such areas. However, these are merely exemplary embodiments, and the central portion 110 can have other dimensions for use in communication devices, packaging modems, hard drives, portable phones, or any other article that is to be packaged.

The illustrated central portion 110 has a generally flat upper surface that an article can rest against. Other non-limiting central portions can have mounting structures, apertures, recesses, partitions, separators, or other suitable structures for inhibiting movement of an article engaging the central portion or for providing additional shock protection. For example, the central portion 110 can have at least one holder that is sized and configured to receive an article.

Fold lines 116, 118 can be defined between the central portion 110 and the foldable portions 112, 114, respectively. The fold lines 116, 118 can be formed as perforations in the frame member 100, i.e., broken cut lines passing partially or completely through the material forming the frame member 100. In the alternative, or in addition, the fold lines 116, 118 can be crushed portions of the material forming the frame member 100. Of course, depending on the material used to construct the frame member 100, the fold lines 116, 118 can be formed as mechanical hinges, thinned portions, adhesive tape, or any other appropriate mechanical connection which would allow various portions of the foldable member to be folded or rotated with respect to each other. These concepts apply to all the fold lines 116, 118 described herein, although this description will not be repeated with respect to the other fold lines described below.

With such fold lines 116, 118, the foldable portions 112, 114 can be bent upwardly or downwardly relative to the central portion 110 as desired. With this flexibility, the foldable portions 112, 114 can be folded upwardly so as to engage pockets on the retention member 200 and folded downwardly to increase tension in the retention member 200, described in greater detail below.

The illustrated configuration of the frame member 100 is merely one example of many different kinds and shapes of frame members that can be used. U.S. Pat. Nos. 6,675,973, 7,882,956, 7,296,681, 7,753,209, 8,028,838, and U.S. patent application Ser. Nos. 11/633,712, 12/497,474, 12/958,261, and 13/221,784, the contents of each of which is hereby incorporated by reference, all disclose various different kinds of frame members with various different combinations of additional folding portions which can be used as a substitute for the illustrated frame member 100.

With reference to FIG. 2, the retention member 200 can be formed from one or more resilient materials, then can optionally include a closure device 202. The retention member 200 is configured to engage and cooperate with the frame member 100. Optionally, the retention member 200 can be configured to engage the foldable portions 112, 114 of the frame member 100 so as to, among other options, generate tension in the retention member 200 when the foldable portions 112, 114 are folded relative to the central portion 110.

The retention member 200 can be formed from a resilient body 204. For purposes of convenience for the following description, the body 204 is identified as having a midpoint M position in the vicinity of the middle of the resilient body 204. Resilient body 204 can also include pocket portions 206, 208 disposed at opposite longitudinal and thereof. In the illustrated embodiment, the retention member 200 is formed from two pieces of resilient material connected together, and sized to cooperate with the foldable portions 112, 114 of the frame member 100.

In the illustrated embodiment, the pockets 206, 208 are formed of folds of the resilient body 204. The folds 206, 208, in some embodiments, can be formed from heat sealing the material forming the resilient body 204 while in a folded state, so as to form pockets. As illustrated in FIG. 2, heat sealing lines 210, 212 extend along lateral edges of the resilient body 204 and act to secure two layers of material to each other as well as form the pockets 206, 208.

One of ordinary skill in the art will appreciate that there are numerous methods for forming the pockets 206, 208 in a resilient sheet material such as the resilient member 204. However, it has been found that heat sealing is particularly advantageous as it does not require expensive adhesives and the time consuming steps required for using such adhesives. However, such adhesives can be used if desired. Welding processes (e.g. induction welding), fusing techniques, and the like can also be used to form the heat sealing lines 210, 212.

The retention member 200, in some embodiments, has a Length $L_1$ that is sized depending in the devices with which the retention member 200 is to cooperate, such as goods. Thus, the Length $L_1$ can be sized such that when the retention member 200 is in its final state, e.g., engaged with the foldable portions 112, 114, it generates the desired tension for the corresponding packaging application. Thus, the Length $L_1$ will be smaller where a higher tension is desired and will be larger where a lower tension is desired. Additionally, the Length $L_1$ might be different for different sized articles that are to be packaged. One of ordinary skill in the art can determine the Length $L_1$ for the corresponding application. Additionally, one of ordinary skill in the art is fully aware of how to perform industry standard drop tests to confirm the appropriate dimensioning of the frame member 100 and the retention member 200.

The retention member 200 can be formed of any resilient material. In some embodiments, the retention member 200 can be formed of two layers of polyethylene films, low density polyethylene (LDPE), polyurethane, TPU, or virtually any polymer, or plastic film. The density of the layers of film can be varied to provide the desired retention characteristics such as overall strength, resiliency, and vibrational response. Preferably the density of the material used to form the retention member 200 is determined such that the retention member 200 is substantially resilient when used to package a desired article. Each of the layers used to form retention member 200 can be monolayer or multilayer sheet depending on the application.

Figure 3:
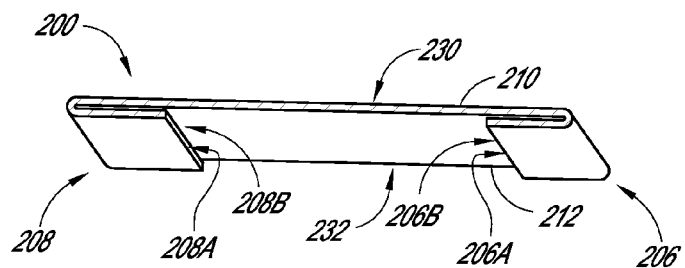
FIG. 3 is a perspective view of the resilient retention member illustrated in FIG. 2.

With reference to FIG. 3, in some embodiments, the retention member 200 can form two pockets on each of the longitudinal ends.

For example, in some embodiments, as illustrated in FIG. 3, the retention member 200 can be formed from an upper layer of resilient material 230 and a lower layer of resilient material 232. The layers 230, 232 can be attached to each other along the heat sealing lines 210, 212 so as to form a void there between, for example being heat sealed along the entire distance between the first and second longitudinal ends. Additionally, the longitudinal ends of these layers 230, 232 can be folded over at the longitudinal ends, and then heat sealed in the folded position, to form the pocket portions 206, 208. In some embodiments, the heat sealing lines 210, 212 extend along the lateral edges of the pockets 206, 208. As such, first pockets 208A, 206A can be formed in the space between the two layers 230, 232. Additionally, a second pocket can be formed 208B between the folded portion and the upper portion of the retention member 200. Similarly, first and second pockets 206A, 206B, can also be formed in the pocket portion 206.

These pockets 206, 206A, 206B, 208, 208A, 208B can be used to engage the foldable portions 112, 114, described in greater detail below.

For example, as illustrated in FIG. 4, the frame member 100 can be used in conjunction with the resilient member 200. The pocket portions 206, 206A, 206B, 208, 208A, 208B can be moved over the foldable portions 112, 114, as illustrated in FIG. 4, when the foldable portions 112, 114 are bend upwardly toward the upper surface of the central portion 110. In the illustrated embodiment, the foldable portions 112, 114 are inserted into the pockets 206B, 208B. The length between the outer edges (i.e., the length of the packaging of the frame member 100) of the foldable portions 112, 114 can be slightly greater than the length $L_1$ of the retention member 200. The article to be packaged 300 can be inserted between the resilient member 200 and the frame member 100 or between the upper and lower layers 230, 232 of the resilient member 200.

For example, in some embodiments, the retention member 200 can include the opening device 202 which can be configured to allow the article 300 to be inserted into the space between the upper and lower layers 230, 232. In some embodiments, the opening device 202 can be in the form of perforations in the upper layer 230 configured to allow the upper layer 230 to be ruptured and opened thereby allowing the insertion of the article 300 into the space between the upper and lower layers 230, 232.

In other embodiments, the opening device 202 can be in the form of a zipper, a tongue-and-groove zip-type closure member, Velcro®, low strength adhesives, flaps, magnets, or any other type of closing device.

Optionally, the opening device 202 can be positioned on the lower layer 232 (illustrated in phantom line in FIG. 4). This configuration can provide further advantages. For example, with the opening device 202 positioned on the lower layer, 232, the opening device 202 is juxtaposed to and faces toward the central portion 110 of the frame member 100. As such, it is less likely that the article 300 can inadvertently pass through the opening device 202 and exit the space between the layers 230, 232.

In some embodiments, opening devices 202 can be provided on both of the upper and lower layers 230, 232. As such, the retention member 200 can be used in various ways, allowing the article to be inserted into the space between the layers 230, 232 through either of the opening devices on either layer 230, 232.

With continued reference to FIGS. 4 and 5, with the article 300 disposed in either the space between the upper and lower layers 230, 232 or between the lower layer 232 and the upper surface of the central portion 110, and with the foldable portions 112, 114, engaged with the pockets 206, 208, the foldable portions 112, 114 can be rotated downwardly in the direction of arrows $R_1$. In this initial movement from the position illustrated in FIG. 4, the foldable portions 112, 114 move away from the Midpoint M of the retention member 200, thereby creating tension in the retention member 200.

As the foldable portions 112, 114 are further pivoted downwardly about the fold lines 116, 118, until they are doubled back adjacent to the lower surface of the central portion 110, the foldable portions 112, 114, continue to add additional tension into the resilient member 200, and more particularly, the upper and lower layers 230, 232 of the resilient member 200. The frame member 100 and the resilient member 200 can be configured to form a spring when disposed in a box or container 310 in the arrangement shown in FIG. 5. For example, the frame member 100 itself can have some shape memory such that the fold lines 116, 118 provide some resistance to movement. Additionally, as noted above, the Length $L_1$ of the retention member 200 can provide tension, resisting the further bending movement of the foldable portions 112, 114 about the fold lines 116, 118, respectively.

Accordingly, when the frame member 100, retention member 200, and the article 300 are arranged in the configuration shown in FIG. 5 inside the container 310, reaction Forces F. resist downward movement of the article 300, thereby providing additional cushioning for the article 300.

Further, the container 310 can define a maximum inner height, for example, when the lid portion of the container 310 is closed. With the maximum inner height set to a dimension less than the maximum overall height of the article 300 and frame member 100, the foldable portions 112, 114 are maintained such that the angular position y (FIG. 5) is maintained at an angle more acute that 90 degrees. Thus, the foldable portions are maintained in an orientation in which the frame member 100 and resilient member 200 work together to act as a shock absorbing spring for the article 300.

FIGS. 6 through 9 illustrate an optional system for manufacturing the resilient member 200. The manufacturing system illustrated in FIG. 6 can be made from well known plastic film processing equipment, such as those components in systems available from the Hudson-Sharp Machine Company. The various rollers, folders, cutters, guides, perforators, and heat sealing devices are all well known and commercially available. Those of the ordinary skill in the art understand how to arrange the various components described below in order to achieve the function and results described below.

Figure 6:
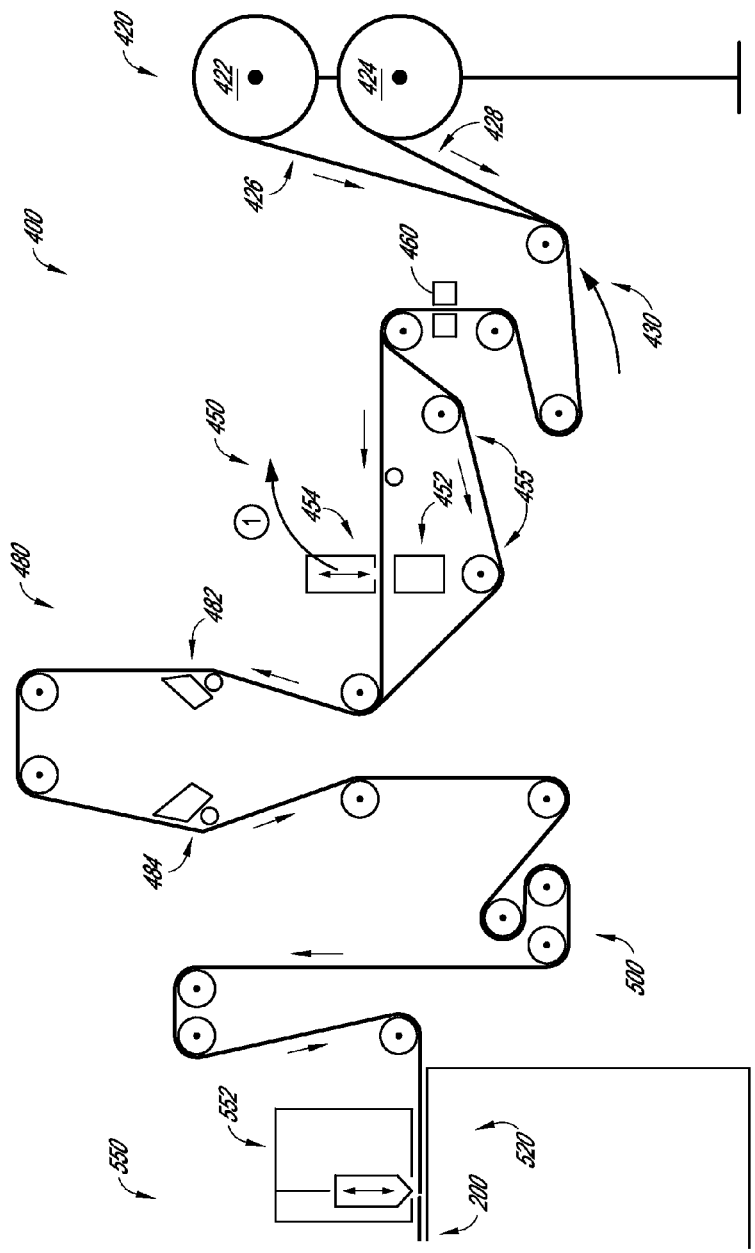
FIG. 6 is a schematic view of a manufacturing device that can be used to manufacture the resilient retention member illustrated in FIGS. 2-3.

With continued reference to FIG. 6, the manufacturing system 400 can include a source portion 420, an opening device portion 450, a folding portion 480, a drive portion 500, a heat sealing portion 520, and a cutting portion 550.

The source portion 420 of the system 400 can include one or more source rolls of raw material for making the resilient member 200. In the illustrated embodiment, the source portion 420 can comprise, in some embodiments, one or more rolls of raw material for forming the resilient member.

In the illustrated embodiment, a first roll 422 serves as a source of the upper layer of film for forming the upper layer 230 of the resilient member 200 and the second roll 424 serves as a source for the material performing the second lower layer 232 of the resilient member 200. In the illustrated embodiment, the rolls 422, 424 are approximately the same width.

Additionally, as described above, the material on the rolls 422, 424 can be different kinds of materials, different thicknesses and have different melting indexes. Additionally, as well known in the art, the rolls 422, 424 are mounted so as to provide some resistance against turning, so as to thereby maintain an acceptable minimum tension.

Those of ordinary skill in the art are familiar with the use of the term "melt index." In particular, the "melt index" is a number that is assigned to a poly film and helps to organize the various types of poly into general groupings based upon the melting temp of the resin they are made out of. The softer the material, then usually the lower the melt index will be assigned to that material.

As illustrated in FIG. 6, a strip of film 426, during operation, will unroll from the roll 422 and be pulled into the apparatus 400 for processing, as described below. Similarly, a strip of material 428, during operation, unrolls from the roll 424. The material 426 is used for forming the upper layer 230 of the resilient member 200 and the second strip 428 is used for forming the lower layer 232 of the resilient member 200. In some embodiments, the strips 426, 428 can have a melt index below 9.

The source 420 can also include one or more tensioning rollers 430 configured for maintaining tension in the strips 426, 428 as they are pulled through the apparatus 400. The tensioning of such layers of material is well known to those of ordinary skill in the art, and thus is not described in further detail.

Optionally, as noted above, the manufacturing apparatus 400 can include an opening portion 450 configured to provide the opening device 202 to the resilient member 200. In the illustrated embodiment, the opening device portion 450 is configured to perforate the strip of material 426 so as to form an opening device 202 in the resilient member 200. In some embodiments, the opening portion 450 can include a block member 452 and a cutting head 454. In such an arrangement, the cutting head 454 can include a cutting blade (not shown) configured to reciprocate in a direction perpendicular to the material 426 in a timed fashion so as to create perforations at desired locations.

Figure 7:
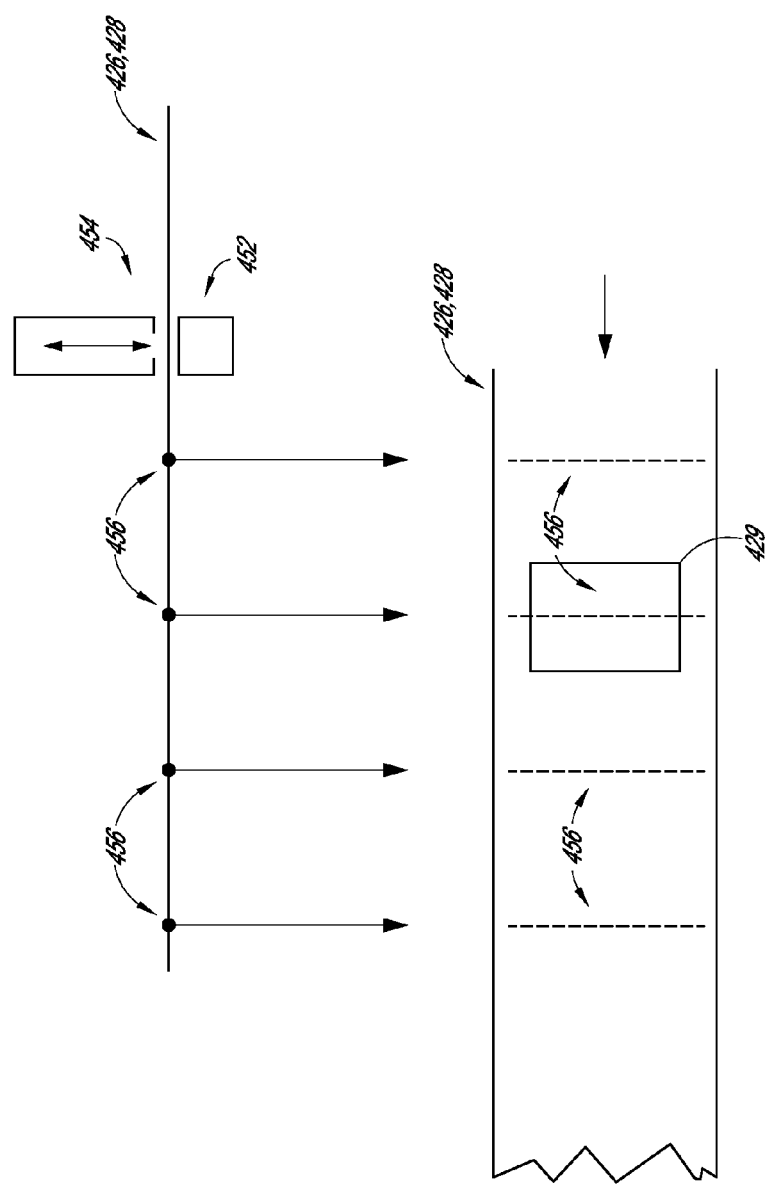
FIG. 7 is a schematic illustration illustrating the function of an opening device that can be used at an opening station in the system of FIG. 6.

For example, as shown in FIG. 7, the cutting device 454 reciprocates upward and downwardly to create a series of perforations 456 at spaced locations along the material 426. The block 452 can provide support for the material 426 as the cutting device 454 perforates the material 426. In some embodiments, both strips can be routed through the cutting device 454, so as to provide opening device 202 in both layers 426, 428.

Optionally, the system 400 can include a set of diverter rollers 455, configured to allow the lower strip 428 to bypass the opening portion 450. Thus, the opening portion can selectively provide opening devices 202 to only one or to both of the strips 426, 428.

In some embodiments, one of or both of the strip 426, 428 can include printed portions 429, such as advertising, tradenames, trademarks, logos, coupons, or other indicia. Thus, the resulting retention member 200 can include such printing on one or both of the layers 426, 428. In some embodiments, one or both of the layers 426, 428 can be pre-printed with the desired printed portions 429. For example, in some embodiments, the printed portions 429 can be applied to the layer 428 and the layer 426 can be translucent or transparent. Thus, during use, the printed portions 429 can be viewed through the upper layer 426 (layer 230 in FIG. 4).

With continued reference to FIG. 6, the system 400 can approximately include a registration device 460 configured to provide a registration function for the timing of actuation of the opening device 450, the heat cutting portion 550 (described below) or any other device that may be used to selectively alter the strips 426, 428 at desired locations. For example, one or more of the strips 426, 428 can be provided with one or more detectable registration marks, such as visible lines (e.g., black marker), which can be used as a registration mark by the registration device 460. The registration device 460 can include an optical sensor (not shown) configured to detect such a registration mark, and to output a signal that can be used to control the various parts of the system 400 to trigger actuation at the desired timing so as to produce the desired effects to the strips 426, 428 at the desired location. Such registration devices 460 are well known in the art and thus are not described in greater detail below.

Using such as registration device 460, the system 400 can be configured to create opening devices and heat seals in locations that are at predetermined spacings from the printed portions 429. For example, the opening devices 202 can be centered on the printed portions 429 and the cuts created by the cutting portion 550 (described below) can be disposed between the printed portions 429. Other spaced relationships can also be used.

As noted above, the manufacturing apparatus 400 can also include a folding portion 480. In the illustrated embodiment, the folding portion 480 can include a first folding portion 482 and a second folding portion 484. The folding portions 482, 484 can be made from curved pieces of metal, configured to guide the edges of the 426, 428 so as to fold over toward the middle of those strips 426, 428.

Figure 8:
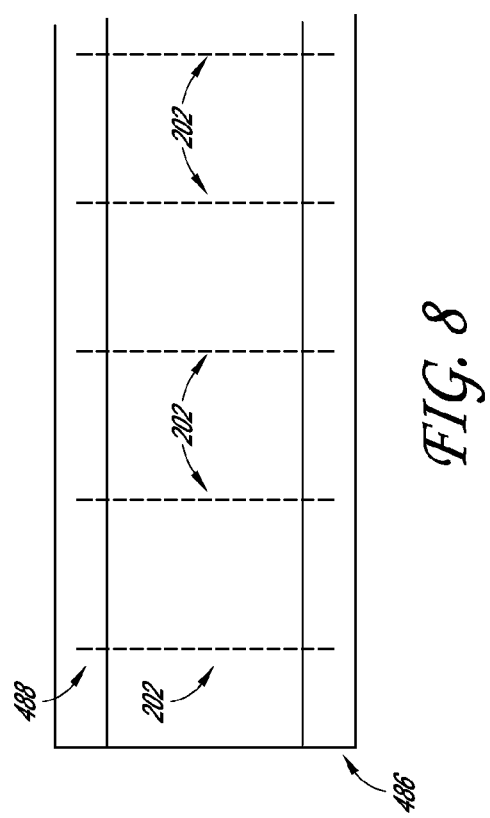
FIG. 8 is a schematic plan view of a continuous strip of a plurality of resilient retention members prior to being heat sealed or cut.

With reference to FIG. 8, the folding portions 482, 484, can be configured to fold one of the lateral edges of the strips 426, 428 as the pass through these folders 482, 484. For example, the folding portion 482 can be configured to fold over the left lateral edge 486 of the strips 426, 428. Additionally the folder portion 484 can be configured to fold over the right side of lateral edge 488 of the strips 426, 428. Further, the folders 482, 484 can be oriented such the resulting position of the opening device 202 is disposed on the top or on the bottom of the resulting retention member 200.

Figure 8A:
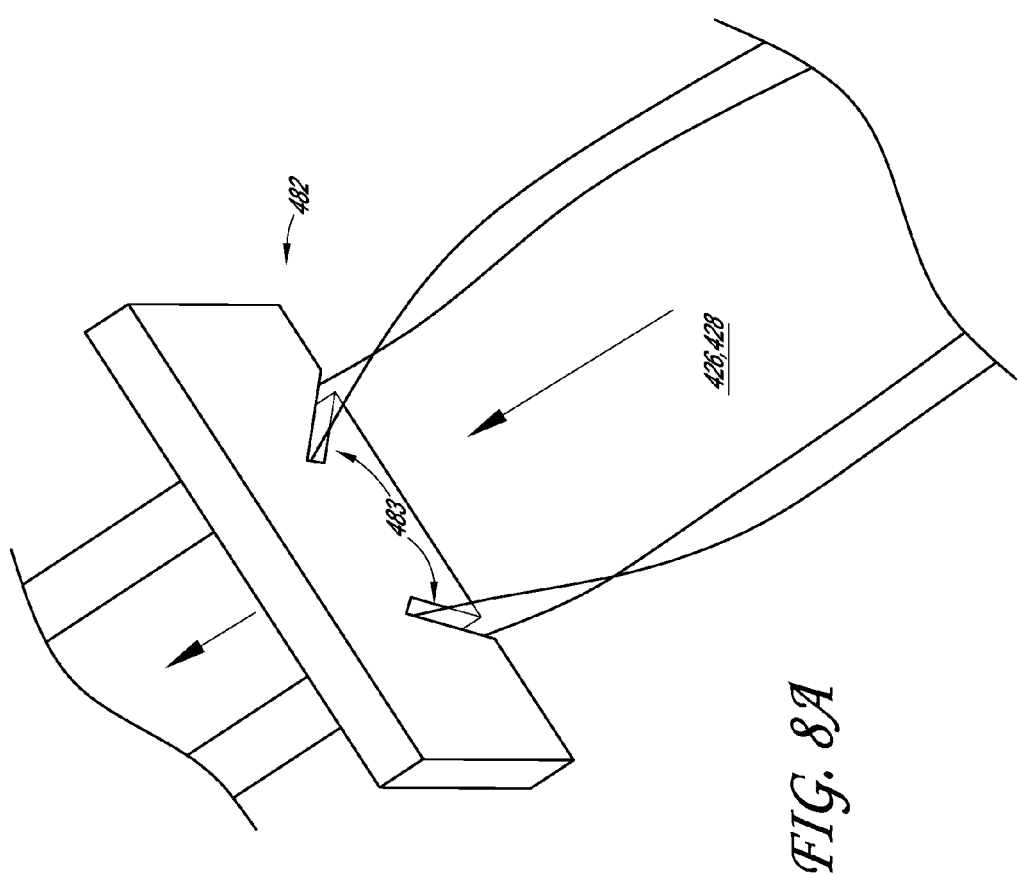
FIG. 8A is a perspective view of an optional folder that can be used with the manufacturing device of FIG. 6.
Figure 9:
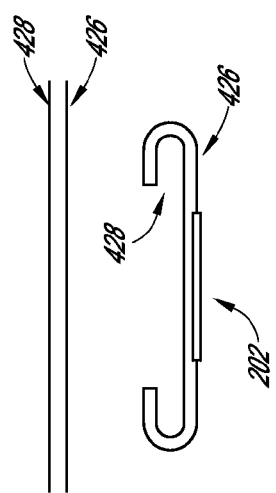
FIG. 9 is a schematic side elevational view of the resilient members illustrated in FIG. 8.

FIG. 9 illustrates a sectional view illustrating the unfolded stated of the layers 426, 428, and the orientation prior to reaching the folder portion 482 and a second folded state of the strips 426, 428 after being discharged from the second folding portion 484. FIG. 8A illustrates an example of a single stage folding portion 482 that can be used to perform the folding noted above. This embodiment of a folder includes a block member with two slits 483 skewed relative to the direction of travel of the strips 426, 428. As the strips 426, 428 pass through the slits 483, the edges of the strips 426, 428 are folded inwardly, thereby changing the orientation of the strips 428, 428 to the orientation shown in FIG. 9.

With continued reference to FIG. 6, the drive portion 500 of the manufacturing apparatus 400 can include a plurality of rollers, one or more of which can be driven with a motor so as to provide a substantial portion of the force for pulling the strips 426, 428 through the various portions of the manufacturing apparatus 400. The configuration of such a set of drive rollers is well known in the art and is not described in greater detail below. However, generally, the control of the speed of the drive rollers 500 is synchronized and otherwise controlled to be in a timed relationship with the operation of the tension portion 430, opening portion 450, folding portion 480, heat sealing portion 520, registration device 460, and cutting portion 550 with a programmable logic controller, a dedicated processor, a general purpose computer, a hardwired controller, or the like.

In the illustrated embodiment, the heat sealing portion 520 and the cutting portion 550 are integrated into single component referred to herein as the heat sealing device 552. However, other configurations can also be used. In the illustrated embodiment, the heat sealing device 552 is configured to form two heat seals between the layers of the strips 426, 428 and to also cut the strips 426, 428, between the two parallel heat seals. Individual resilient members 200 are then discharged from the device 552.

FIG. 10 illustrates a more detailed view of the heat sealing device 552.

With reference to FIG. 10, the heat sealing device 552 can include a heat sealing and cutting head 554 mounted so as to reciprocate relative to the incoming strips 426, 428. As with the opening portion 450, the heat sealing and cutting head 554 is timed relative to the movement of the strips 426, 428 so as to provide the final product with the desired shape.

The heat sealing and cutting head 554 can include a first heat sealing portion 556, a second heat sealing portion 558 and a cutting portion 560. As the strips 426, 428 move under the head 554, the head can move downwardly and press the first and second heat sealing portions 556, 558 and the cutting portion 560 down into the strips 426, 428, so as to simultaneously generate two heat sealed edges and cut those the strips 426, 428 into individual retention members 200.

As noted above, the strips 426, 428 enter the heat sealing portion 552 with both lateral edges folded, as shown in the lower portion of FIG. 10. As such, the heat sealing portion 552 can receive the strips 426, 428 which are generally not attached to each other as they enter the heat sealing portion 552, and simultaneously heat seal and cut the lateral edges, thereby forming individual resilient members 200 in a substantially continuous manner. The heat sealing portion 552 can include a conveyor system to carry the sheets 426, 428 into the area beneath the reciprocating head 554 and to carry the cut resilient members 200 away from the cutting head 554.

Optionally, the cutting portion 560 can be configured to only perforate or score the strips 426, 428 between the heat seals created by the heat sealing portions 558, 556 so that the resilient members 200 are still attached but easily separatable from each other. This allows the resilient members 200 to be formed into a finished roll and torn off, similar to a roll of paper towels. Using this optional approach, the heat sealed strips 426, 428 can be rolled onto another roller (not shown) and shipped to customers as a roll of resilient members.

As noted above, the strips 426, 428 can be made from materials having different melt indexes. The melt index of a material refers to the temperature at which the material will begin to flow and thereby can form clean heat seals. Most materials have different melt index values. The melt index values of many soft polys vary from about 7.0 to 9.7. Thus, the layer strips 426, 428 can have different melt indexes and conveniently if those melt indexes are in the range of about 7.0 to about 10.0, they can be easily heat sealed together using the above-described apparatus 400 and provide clean heat seals.

Further, the strips 426, 428 can have different modules of elasticity. In some embodiments, for example, more flexible material can be used as the top layer 426 while a relatively stiffer layer can be used as the lower layer 428. For example, the upper layer, and some embodiments is a polyurethane while a low density polyethylene is used as the lower layer 428. In this example, a six inch wide, 24 inch long strip of low density polyethylene will stretch only about six inches before failure while a six inch wide by 24 inch long strip of polyurethane will stretch 18 inches before failure. Although these materials behave very differently with regard to failure, they can be easily heat sealed together using the apparatus 400 described above and provide the desired shock absorption for packaging articles 300 described above.

The thicknesses of the strips 426, 428 can also be different. For example, depending on the application, one of the strips 426, 428 can be thinner than the other layer for example, by one or more mills (thousandths of an inch). This can help save cost of materials because thinner materials are less expensive, less waste, etc.

Further, because various different kinds of material can be heat sealed together as described above, the colors of the materials can also be different. For example, the strip 426 could be translucent or transparent and the strip 428 could be translucent or opaque. Thus, the strip 428 could include printed portions 429 that can be seen through the layer formed by the strip 426. The printed portions could be any form of advertising, including but without limitation, trademarks, tradenames, service marks, logos, coupons, etc.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A suspension packaging assembly comprising:
    at least one frame member having a central portion, a first end and a second end disposed opposite the first end relative to the central portion, a first foldable portion disposed at the first end and a second foldable portion disposed at the second end;
    a resilient retention member assembly comprising:
        a first layer having first and second longitudinal ends and first and second lateral edges, and
        a second layer having first and second longitudinal ends and first and second lateral edges,
        a void formed between the first layer and the second layer, the first layer being heat sealed to the second layer along the corresponding first and second lateral edges to form the void,
        a first folded portion and a second folded portion folded against an upper portion of the resilient retention member, wherein the first layer and the second layer are folded at the first longitudinal end to form the first folded portion and wherein the first layer and the second layer are folded at the second longitudinal end to form the second folded portion, the first and second folded portions being heat sealed to the upper portion along lateral edges of the first and second folded portions,
    first pocket portions formed between the first layer and the second layer at the first and second folded portions, and
    second pocket portions formed between the first and second folded portions and the upper portion.

2. The suspension packaging assembly according to claim 1, wherein the first layer has a first thickness and a first elasticity and the second layer has a second thickness and a second elasticity.

3. The suspension packaging assembly according to claim 1, wherein the first layer is formed of a first material, the second layer being formed of a second material that is different from the first material.

4. The suspension packaging assembly according to claim 1, wherein the first layer is formed of a material having a first modulus of elasticity, the second layer being formed of a material that has a second modulus of elasticity that is different from the first modulus of elasticity.

5. The suspension package assembly according to claim 1, wherein the first layer is translucent and the second layer is opaque.

6. The suspension package assembly according to claim 1, wherein the first layer is thinner than the second layer by at least one mil.

7. The suspension package assembly according to claim 6, wherein the first layer is thinner than the second layer by at least three mils.

8. The suspension package assembly according to claim 1, wherein the first layer is made from low-density polyethylene (LDPE) and the second layer is polyurethane.

9. A resilient retention member for providing damage protection for packaged goods, comprising:
    a first layer having first and second longitudinal ends and first and second lateral edges;
    a second layer having first and second longitudinal ends and first and second lateral edges, the first layer being heat sealed to the second layer along the corresponding first and second lateral edges along the entire distance between the first and second longitudinal ends to form a void between the first layer and the second layer;
    a first folded portion and a second folded portion folded against an upper portion of the resilient retention member, wherein the first layer and the second layer are folded at the first longitudinal end to form the first folded portion and wherein the first layer and the second layer are folded at the second longitudinal end to form the second folded portion, the first and second folded portions being heat sealed to the upper portion along lateral edges of the first and second folded portions;
    first pocket portions formed between the first layer and the second layer at the first and second folded portions; and
    second pocket portions formed between the first and second folded portions and the upper portion.

10. The retention member according to claim 9 additionally comprising at least one opening in the first layer.

11. The retention member according to claim 9, wherein the first layer is thinner than the second layer by at least one mil.

12. The retention member according to claim 9, wherein the first layer is thinner than the second layer by at least three mils.

13. The retention member according to claim 9, wherein the first layer is heat sealed to the second layer at two positions spaced inwardly from the first and second longitudinal ends of the first and second layers, respectively.

* * * * *

UNITED STATES PATENT AND TRADEMARK OFFICE
CERTIFICATE OF CORRECTION

Page 1 of 1

PATENT NO. : 9,067,722 B2
APPLICATION NO. : 13/620543
DATED : June 30, 2015
INVENTOR(S) : McDonald et al.

It is certified that error appears in the above-identified patent and that said Letters Patent is hereby corrected as shown below:

In the Specification

In column 7 at line 29, Change "F." to --$F_r$--.

Signed and Sealed this
Twenty-sixth Day of April, 2016

Michelle K. Lee
*Director of the United States Patent and Trademark Office*